(12) United States Patent
Hoss et al.

(10) Patent No.: US 9,726,568 B2
(45) Date of Patent: Aug. 8, 2017

(54) DEVICE AND METHOD FOR CHECKING AN ASSEMBLY WRENCH

(71) Applicant: Robert Bosch GmbH, Stuttgart (DE)

(72) Inventors: Reinhard Hoss, Plochingen (DE); Joerg Staib, Boll, DE (US); Gerhard Lemke, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 14/650,947

(22) PCT Filed: Oct. 15, 2013

(86) PCT No.: PCT/EP2013/071490
§ 371 (c)(1),
(2) Date: Jun. 10, 2015

(87) PCT Pub. No.: WO2014/090443
PCT Pub. Date: Jun. 19, 2014

(65) Prior Publication Data
US 2015/0323407 A1   Nov. 12, 2015

(30) Foreign Application Priority Data
Dec. 10, 2012 (DE) ......................... 10 2012 222 600

(51) Int. Cl.
*G01L 25/00* (2006.01)

(52) U.S. Cl.
CPC ................................. *G01L 25/003* (2013.01)

(58) Field of Classification Search
USPC ....................................................... 73/1.12
See application file for complete search history.

(56) References Cited

U.S. PATENT DOCUMENTS

| 5,099,678 | A | 3/1992 | Grabovac et al. |
| 5,911,154 | A * | 6/1999 | Hsieh ................... G01L 25/003 73/1.12 |
| 6,094,980 | A | 8/2000 | Larson et al. |
| 7,757,540 | B2 * | 7/2010 | Dabrowski ........... G01L 25/003 73/1.12 |
| 2014/0352398 | A1 * | 12/2014 | Lemke ..................... G01L 5/24 73/1.12 |

FOREIGN PATENT DOCUMENTS

| CN | 101520357 A | 9/2009 |
| CN | 101526413 A | 9/2009 |
| CN | 201955075 U | 8/2011 |
| DE | 20 2009 005 951 U1 | 10/2009 |
| DE | 202011050771 | 11/2011 |
| DE | 102010040217 | 3/2012 |
| JP | H08-110277 A | 4/1996 |

OTHER PUBLICATIONS

International Search Report for PCT/EP2013/071490, issued on Mar. 3, 2014.

* cited by examiner

*Primary Examiner* — Clayton E Laballe
*Assistant Examiner* — Warren K Fenwick
(74) *Attorney, Agent, or Firm* — Norton Rose Fulbright US LLP; Gerard Messina

(57) ABSTRACT

A device for testing an assembly wrench has a tool holder, and a drive element includes a fixing device which is configured to fix the tool holder. A receiving device is configured to receive and fix the drive element and may be pivoted over an arc, and at least two stops are disposed along the arc and are configured to arrest the receiving device in one defined position at a time.

12 Claims, 6 Drawing Sheets

DEVICE AND METHOD FOR CHECKING AN ASSEMBLY WRENCH

FIELD OF THE INVENTION

The present invention relates to a device and a method for checking an assembly wrench, especially an assembly wrench having an integrated torque measuring and angle measuring device.

BACKGROUND INFORMATION

For tightening screw connections with a predefined torque, use is increasingly being made of assembly wrenches that in addition to or instead of having a conventional measuring device for measuring and displaying the torque exerted on the screw joint have an integrated angle measuring device with an angle display which measures and displays the angle by which the assembly wrench has been turned. The angle by which the assembly wrench has been turned is measured in that case, for example, by a gyrometer integrated in the assembly wrench.

With assembly wrenches of that kind it is possible, by pretightening the screw connection using a slight torque and subsequently turning the assembly wrench by a defined rotation angle, to produce screw connections in which the preload force of the screw connection moves within a smaller tolerance range than in the case of tightening using a conventional assembly wrench which directly measures and displays the tightening torque applied to the screw connection or "slips" if a predefined tightening torque is exceeded.

In order to ensure a constant quality of the screw connections produced in that manner, regular checking and, where appropriate, calibration of the angle measuring device integrated in the assembly wrench is required.

Hitherto-known methods for checking and calibrating such assembly wrenches are either so complicated that they require the assembly wrench to be sent in to the manufacturer, and therefore are tedious and costly, or they do not have the requisite accuracy, such as, for example, checking of the angle display with so-called angle disks.

SUMMARY

It is an object of the present invention to check assembly wrenches having an integrated angle measuring device rapidly, cost-effectively and with great accuracy.

A testing device according to the invention for an assembly wrench having a tool holder (fork attachment) and a drive element has a receiving device which is configured to receive and fix the assembly wrench and which may be pivoted over an arc. The receiving device also has a fixing device which is configured to fix the tool holder. The testing device has at least two stops, which are disposed at defined positions along the arc and are configured to arrest the receiving device in one defined position at a time.

A method according to the invention for testing an assembly wrench having a tool holder and a drive element includes the steps of fixing the tool holder in a fixing device; fixing the drive element in a pivotable receiving device; positioning the receiving device in a defined initial position; preloading the assembly wrench with the aid of a preloading device; pivoting the receiving device to a defined target position predefined by a target stop; and reading an angle display of the assembly wrench and comparing the value read with a value predefined by the starting position and the target position.

The method according to the invention and the device according to the invention make it possible to check and, where appropriate, calibrate an assembly wrench rapidly, at low cost and without long downtimes, in particular without sending it back to the manufacturer. Owing to the low weight and small dimensions of a device according to the invention, the checking operation may also be performed on a mobile basis, for example in the workshop.

In one embodiment, the device has a base plate in which at least two receiving arrangements, each for receiving one stop, are constructed. A base plate in which receiving arrangements for the stops are constructed allows the positions of the stops to be defined with great accuracy. It is also possible for receiving arrangements to be provided for the stops at several positions which make it possible to check the assembly wrench at rotations by various angles.

In one embodiment, the stops contain magnets which prevent bouncing of the assembly wrench against the stops and enable the assembly wrench to be securely fixed at the stops. The measurements may thus be made with an especially high degree of accuracy.

In one embodiment, the testing device has, in addition, a preloading device which enables the assembly wrench to be preloaded, and thereby activated, before the start of the measurement.

In one embodiment, the testing device has, in addition, a drive device which is configured to drive the receiving device. Using such a drive, the movement of the receiving device may proceed especially easily and evenly, in particular without jolting.

The drive device may be in the form of an electric motor. An electric motor provides a drive device that is especially convenient to actuate. It is possible for a slip clutch and/or a limit switch to be provided in order to switch off the motor when the receiving device is resting against the target stop.

Alternatively, the drive device may be constructed in the form of a cable pull driven by a weight. A cable pull driven by a weight provides an especially simple and inexpensive drive device.

The drive device may also have a spring, especially a gas-filled spring, which likewise provides an inexpensive and maintenance-free drive device that is very suitable, in particular that operates without jolting.

Alternatively, the receiving device may be driven by its own weight in combination with the assembly wrench's own weight. For that purpose, the testing device is clamped into the vise at an oblique angle, for example oriented at a deviation of 5° to 10°, especially 8°, from the horizontal, so that the receiving device pivots from the initial position into the target position by its own weight and the weight of the attached assembly wrench. In that manner, it is possible for a jolt-free pivoting movement of the assembly wrench to be achieved even without an additional drive device.

In one embodiment, the testing device has, in addition, an arresting device which is configured to arrest the receiving device especially in the starting position. An arresting device enables the receiving device together with the assembly wrench to be reliably arrested in the initial or starting position before the start of the measurements.

The testing device may additionally have a mounting which enables the testing device to be clamped in a vise. In that manner, the testing device may be used especially well on a mobile basis and, in particular, directly in the workshop environment.

DETAILED DESCRIPTION

Figure 1A:
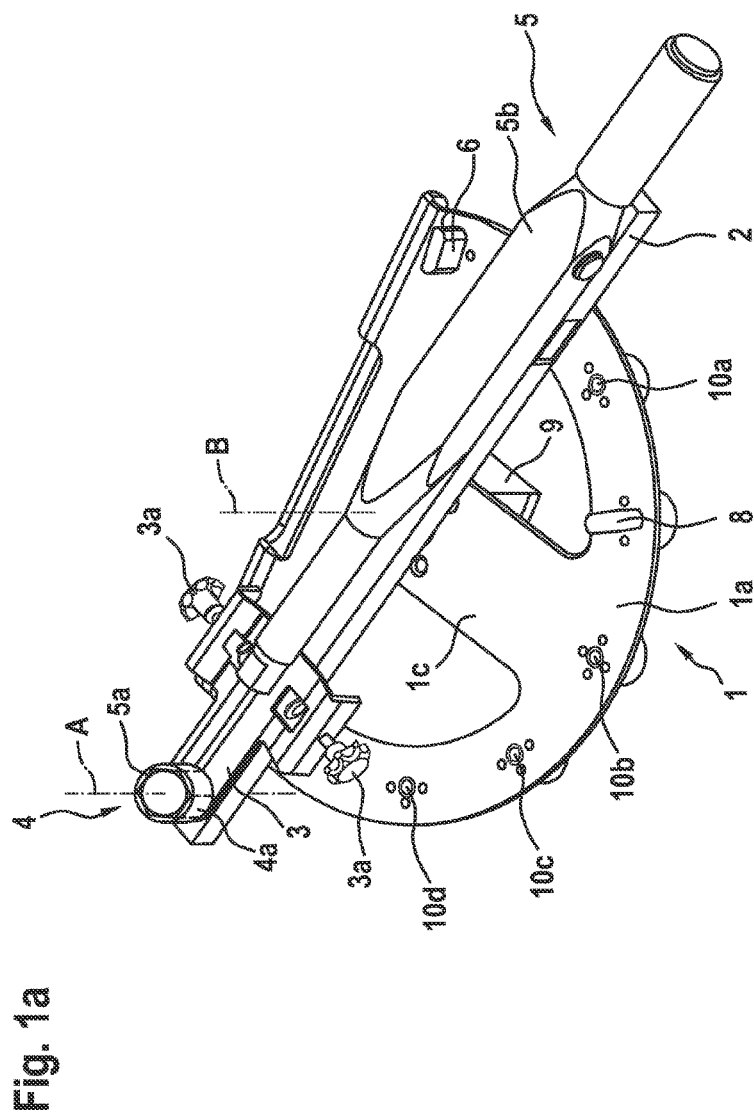
FIG. 1a is a perspective view of a first exemplary embodiment of a testing device according to the invention.
Figure 1B:
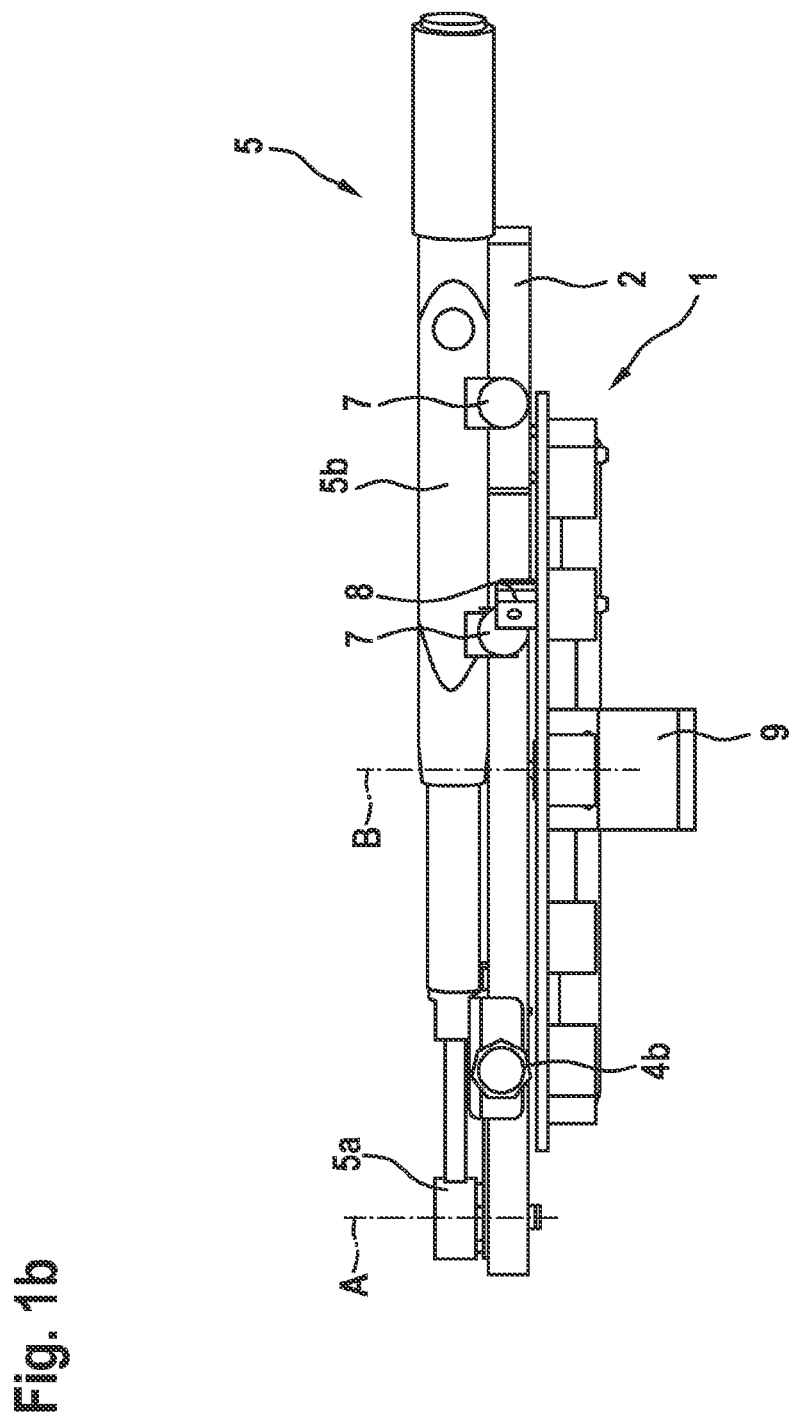
FIG. 1b is a side view of the first exemplary embodiment of a testing device according to the invention.
Figure 1C:
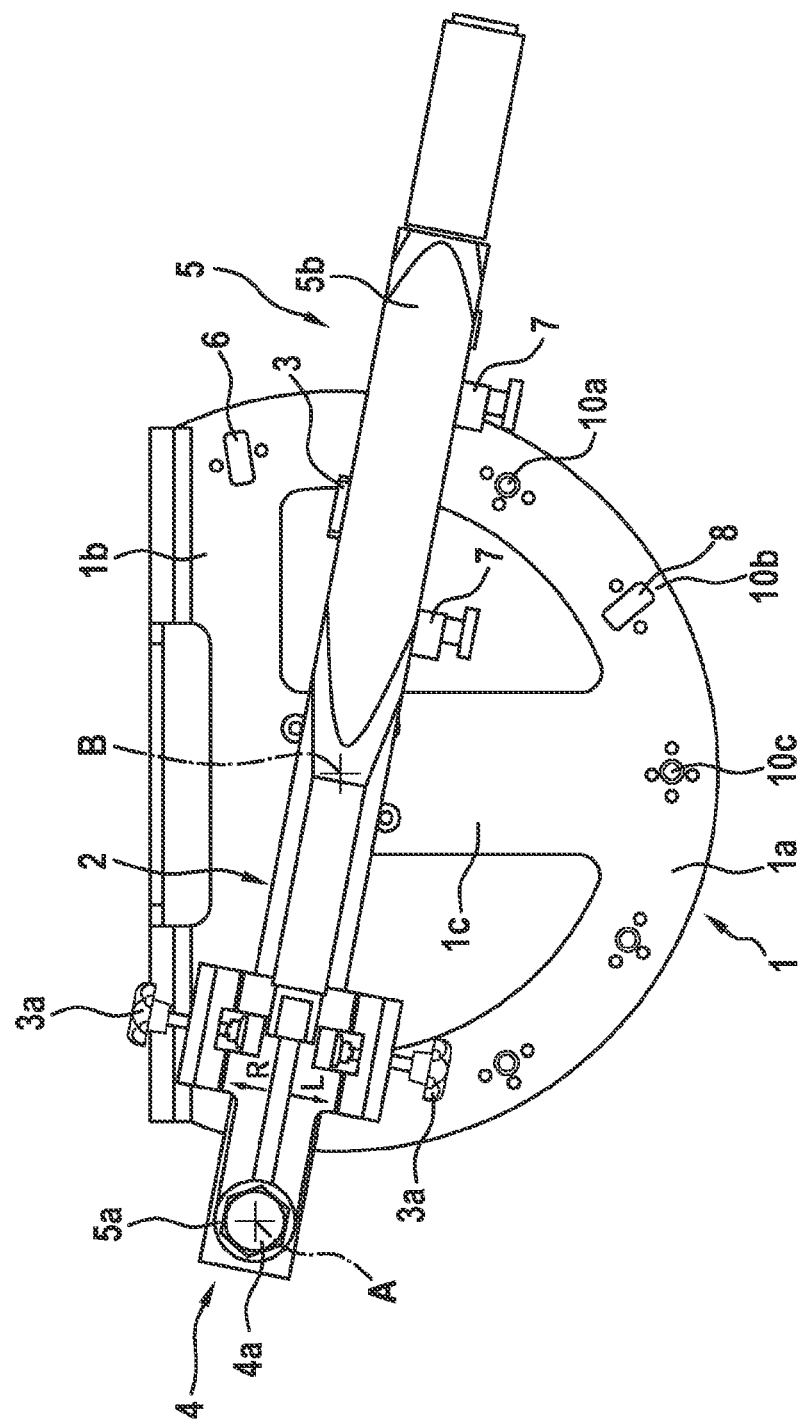
FIG. 1c is a plan view of the first exemplary embodiment of a testing device according to the invention.

FIGS. 1a through 1c show a first exemplary embodiment of a testing device according to the invention in a perspective view (FIG. 1a), in side view (FIG. 1b), and in plan view (FIG. 1c).

The testing device has a base plate 1 constructed to have a semicircular region 1a and a first straight region 1b which connects the two ends of semicircular region 1a together. A second straight region 1c is constructed at a right angle to first straight region 1b in such a manner that it connects a central region of first straight region 1b with the summit of semicircular region 1a.

On the underside of base plate 1, a mounting block 9 is provided at which the testing device may be clamped, for example, into a vise, not shown in the Figures, and fixed in that manner.

On an upper side of base plate 1 opposite the underside, a supporting arm 2 is supported in such a manner that it is rotatable in a plane oriented parallel to the plane of base plate 1, about an axis B disposed in second straight-line region 1c at the center point of semicircular region 1a.

An assembly wrench 5 to be tested is clamped onto and fixed to supporting arm 2 with the aid of a holding plate 3, which supports a forward region of assembly wrench 5 at the tool holder end, and two clamping jaws 7, which act on a rear region of assembly wrench 5 at the handle end. Tool holder (fork attachment) 5a of assembly wrench 5 is placed on a hexagonal head 4a of a torque preloading device 4 which is constructed on supporting arm 2.

Before the start of the measurement, supporting arm 2 is placed against a start stop 6 provided on base plate 1 and is fixed to start stop 6, in particular by a magnet integrated in start stop 6. Supporting arm 2 is thereby situated in a defined starting position before the measurement begins.

At the start of the angle measurement, assembly wrench 5 requires a previously set starting torque. By turning at least one of the adjusting screws 3a provided at holding plate 3, assembly wrench 5 is rotated slightly in holder 3 about axis A of hexagonal head 4a in order to apply the necessary starting torque to assembly wrench 5. The internal angle display of assembly wrench 5 is set to the angle 0°.

The actual angle measurement or angle testing of assembly wrench 5 begins with supporting arm 2 being taken off start stop 6. Supporting arm 2 and assembly wrench 5 are taken in an even pivoting motion about axis B to a target stop 8 provided on semicircular region 1a of base plate 1. Target stop 8 preferably likewise includes a magnet for fixing supporting arm 2 to target stop 8 and thus preventing bouncing of supporting arm 2 and assembly wrench 5 against target stop 8.

The angle by which assembly wrench 5 has been turned during the pivoting motion described above is measured by an angle measuring device integrated in the assembly wrench, which device contains, for example, a gyrometer of the kind known from aircraft model making, and is displayed on a display device (not shown in the Figures) of assembly wrench 5.

The angle value displayed on the display device of assembly wrench 5 when the latter is resting again target stop 8 is read and compared with a desired value predefined by the position of target stop 8 on semicircular region 1a of base plate 1, especially by the angular distance between the two stops 6, 8, and assessed.

If the actual value read off at assembly wrench 5 deviates by more than a predefined tolerance value from the desired value, the angle measuring device in assembly wrench 5 is readjusted.

Provided in base plate 1 are various insertion positions 10a, 10b, 10c, 10d configured to receive target stop 8 at various angular distances from start stop 6. The angle measuring device of assembly wrench 5 is thus able to be checked and, if appropriate, readjusted for various rotation angles of assembly wrench 5.

The positions of stops 6, 8 in insertion positions 10a, 10b, 10c, 10d and, in particular, the angular distance between insertion positions 10a, 10b, 10c, 10d and hence stops 6, 8 are known to a high degree of accuracy on account of an especially precise construction of base plate 1 and, where appropriate, on account of an additional measurement of base plate 1 in which the angles between start stop 6 and insertion positions 10a, 10b, 10c, 10d or target stop 8 are determined highly accurately.

Using an additionally insertable, mirror-image arrangement of start stop 6 and target stop 8 on the opposite side (that shown on the left in FIGS. 1a and 1c) of semicircular region 1a of base plate 1, the test described above may be carried out both for a rotation in the clockwise direction and for a rotation in the counterclockwise direction.

The sequence of the checking operation in the counterclockwise direction is a mirror image of the above-described checking procedure in the clockwise direction.

Figure 2A:
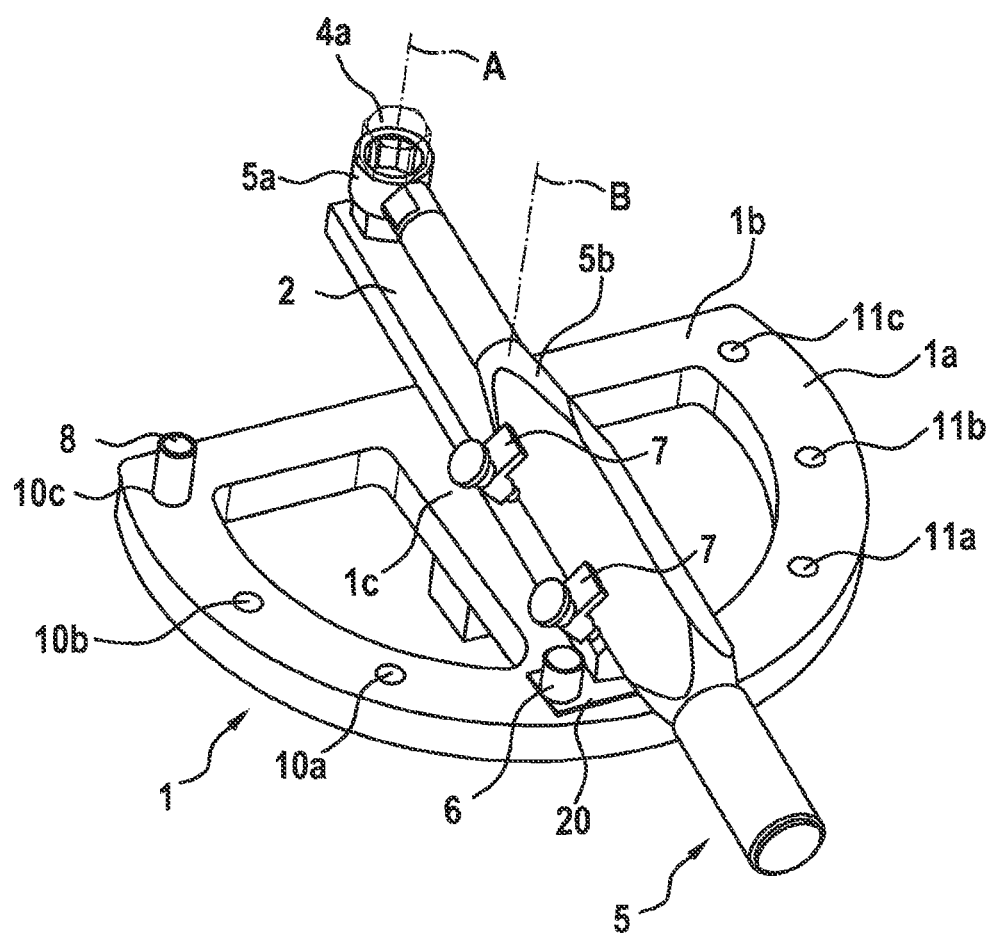
FIG. 2a is a perspective view of a second exemplary embodiment of a testing device according to the invention.
Figure 2B:
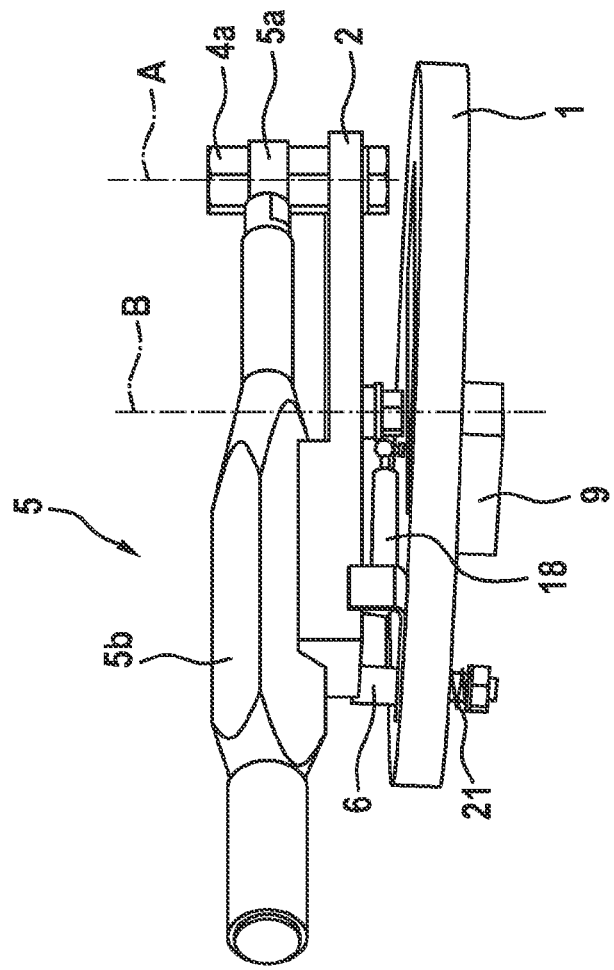
FIG. 2b is a side view of the second exemplary embodiment of a testing device according to the invention.
Figure 2C:
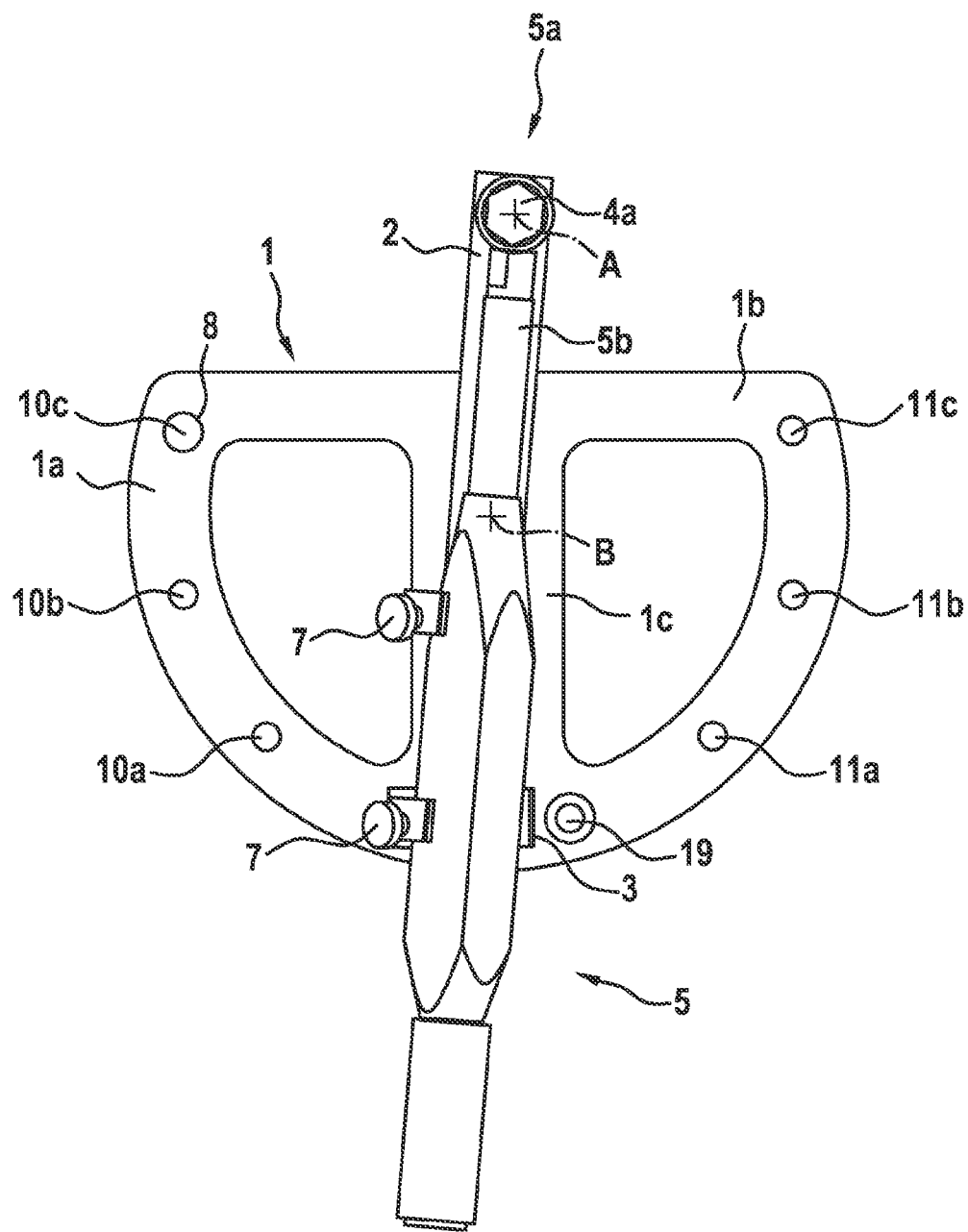
FIG. 2c is a plan view of the second exemplary embodiment of a testing device according to the invention.

FIGS. 2a through 2c show a second exemplary embodiment of a testing device according to the invention in a perspective view (FIG. 2a), in side view (FIG. 2b), and in plan view (FIG. 2c).

The testing device in accordance with the second exemplary embodiment also has a base plate 1 which, just like base plate 1 of the first exemplary embodiment, is constructed to have a semicircular region 1a, a first straight region 1b, which connects the two ends of semicircular region 1a, and a second straight region 1c. Second straight region 1c connects the center of first straight region 1b with the summit of semicircular region 1a.

On base plate 1 of the second exemplary embodiment also, a supporting arm 2 is supported in such a manner that it is rotatable or pivotable about an axis B disposed in second straight region 1c at the center point of semicircular region 1a.

Assembly wrench 5 is clamped onto and fixed to supporting arm 2 with the aid of a hexagon bolt 4a and two clamping jaws 7. Supporting arm 2 is preloaded by a gas-filled spring 18 with integrated damping, which is disposed between base plate 1 and supporting arm 2, and is held in its starting position approximately parallel to second straight region 1c of base plate 1 by a pin-shaped start stop 6. As in the first exemplary embodiment, by turning hexagon bolt 4a about axis A a preload is applied to assembly wrench 5. The internal angle display of assembly wrench 5 is set to the angle 0°.

After a bar 20 has been released, the pin of start stop 6 is pulled away from supporting arm 2 by a spring 21 disposed beneath base plate 1 and releases supporting arm 2. The force of gas-filled spring 18 then sets supporting arm 2 in motion and turns supporting arm 2 with assembly wrench 5 fixed thereto about axis B, along semicircular region 1a of base plate 1, to a target stop 8 which is fixed in one of insertion positions 10a, 10b, 10c constructed in semicircular region 1a of base plate 1. Gas-filled spring 18 moves supporting arm 2 in that operation without jolting and without abrupt changes in speed.

The angular distance between start stop 6 and target stop 8 is known to a high degree of accuracy on account of the precise construction of base plate 1 and, where appropriate, on account of an additionally performed measurement of the checking device to determine the angle between start stop 6 and target stop 8 with great accuracy.

The angle value measured by the angle measuring device in assembly wrench 5 and displayed on assembly wrench 5 is read and compared with the desired value predefined by the angular distance between the two stops 6, 8, and assessed.

The checking operation may be carried out for various angular distances by using different insertion positions 10a, 10b, 10c, 10 for target stop 8, which are constructed in semicircular region 1a of base plate 1.

In the second exemplary embodiment also, as described in connection with the first exemplary embodiment the checking operation may be carried out both in the case of a rotational motion in the clockwise direction and in the case of a rotational motion in the counterclockwise direction.

Checking in the case of a rotational motion in the counterclockwise direction is made possible, in particular, by a mirror-image or additional arrangement of start stop 6 and target stop 8 in insertion positions 19a, 11a, 11b, 11c, 11d on the opposite side (that shown on the right in FIGS. 2a and 2c) of base plate 1.

Gas-filled spring 18 is disposed in such a manner that it is oriented substantially parallel to second straight region 1c, in the center of base plate 1. Bores 19 for start stop 6 are disposed outside of that line, so that gas-filled spring 18 exerts a force or rather a torque on supporting arm 2 in both directions. In a measurement in the counterclockwise direction, before the start, supporting arm 2 is pressed against start stop 6 on the right-hand side. The sequence of the checking operation in the counterclockwise direction corresponds to the above-described checking procedure in the clockwise direction.

The device in accordance with the second exemplary embodiment also may be clamped at a mounting block 9 into a vise not shown in the Figures.

What is claimed is:

1. A device for checking an assembly wrench having a tool holder and a drive element, comprising:
    a receiving device configured to receive and fix the assembly wrench, the receiving device being pivotable over an arc and including a fixing device configured to fix the tool holder; and
    at least two stops disposed at defined positions along the arc and suitable for arresting the receiving device in one defined position at a time.

2. The device as recited in claim 1, further comprising a base plate in which at least two receptacles, each for receiving one stop, are constructed.

3. The device as recited in claim 1, wherein at least one of the stops includes a magnet.

4. The device as recited in claim 1, further comprising a preloading device configured in such a manner that the preloading device enables the assembly wrench to be preloaded.

5. The device as recited in claim 1, further comprising a drive device configured to pivot the receiving device about an arresting device along the arc.

6. The device as recited in claim 5, wherein the drive device includes one of an electric motor, a cable pull driven by a weight, and a spring.

7. The device as recited in claim 6, wherein the spring is a gas-filled spring.

8. The device as recited in claim 1, further comprising an arresting device configured to arrest the receiving device in a starting position.

9. The device as recited in claim 1, further comprising a mounting that enables the device to be clamped in a holding device.

10. The device as recited in claim 9, wherein the holding device includes a vise.

11. A method for testing an assembly wrench having a tool holder and a drive element, comprising:
    fixing the tool holder in a fixing device;
    fixing the drive element in a pivotable receiving device;
    positioning the receiving device in an initial position defined by a start stop;
    preloading the assembly wrench with the aid of a preloading device;
    pivoting the receiving device to a target position defined by a target stop;
    reading a value from an angle display of the assembly wrench and comparing the value read with a predefined value.

12. The method as recited in claim 11, further comprising orienting the receiving device in such a manner that receiving device pivots from the initial position into the target position by a weight of the receiving device.

* * * * *